US005962945A

United States Patent [19]

Krenzer et al.

[11] Patent Number: 5,962,945

[45] Date of Patent: Oct. 5, 1999

[54] MULTIPLE PARALLEL CONDUCTOR

[75] Inventors: Hans-Joachim Krenzer; Joachim Runge, both of Arolsen, Germany

[73] Assignee: Alcatel, France

[21] Appl. No.: 09/057,296

[22] Filed: Apr. 8, 1998

[30] Foreign Application Priority Data

| | | | |
|---|---|---|---|
| Apr. 17, 1997 | [DE] | Germany | 197 15 978 |
| Jul. 1, 1997 | [DE] | Germany | 197 27 758 |

[51] Int. Cl.[6] .............................. H02K 3/00; H01F 27/28

[52] U.S. Cl. .......................... 310/208; 174/10; 174/70 R; 310/201

[58] Field of Search .................................... 310/208, 195, 310/201; 174/70 R, 10, 112

[56] References Cited

U.S. PATENT DOCUMENTS

| | | | |
|---|---|---|---|
| 2,147,337 | 2/1939 | Charmoy | 310/208 |
| 4,041,237 | 8/1977 | Stine et al. | 174/36 |
| 4,096,346 | 6/1978 | Stine et al. | 174/36 |
| 4,237,337 | 12/1980 | Serrander | 174/70 R |
| 5,066,881 | 11/1991 | Elton et al. | 310/213 |
| 5,175,396 | 12/1992 | Emery et al. | 174/36 |
| 5,306,868 | 4/1994 | Faust et al. | 174/23 R |
| 5,371,825 | 12/1994 | Traut | 385/109 |
| 5,577,366 | 11/1996 | Higgins | 53/399 |

FOREIGN PATENT DOCUMENTS

| | | | |
|---|---|---|---|
| 0 859 381 A1 | of 0000 | European Pat. Off. . | |
| 2 394 156 | of 0000 | France . | |
| 24 02 149 A1 | of 0000 | Germany . | |
| 60-167642 | 8/1985 | Japan | 310/208 |
| 62-71446 | 4/1987 | Japan | 310/208 |
| 1-274634 | 11/1989 | Japan | 310/208 |
| 2-123942 | 5/1990 | Japan | 310/208 |
| 6-225489 | 8/1994 | Japan | 310/208 |
| WO 92/10840 A1 | of 0000 | WIPO . | |
| WO 95/30991 A1 | 11/1995 | WIPO | H01F 27/32 |

*Primary Examiner*—Nestor Ramirez

*Assistant Examiner*—Burt Mullins

*Attorney, Agent, or Firm*—Ware, Fressola, Van der Sluys & Adolphson LLP

[57] ABSTRACT

In a multiple parallel conductor (1), in particular a continuously transposed cable, used for windings of electrical devices and machines, each strand has its own electrical insulation and all strands are provided with a common wrapping. Underneath the wrapping (9), there is arranged at least one rip cord (11) extending in the longitudinal direction of the multiple parallel conductor (1) for easy removal of the wrapping (9) before a winding is formed.

14 Claims, 1 Drawing Sheet

MULTIPLE PARALLEL CONDUCTOR

BACKGROUND OF THE INVENTION

1. Technical Field

The invention relates to a multiple parallel conductor, in particular a continuously transposed cable, used for windings of electrical devices and machines, with a plurality of strands wherein each strand has a separate electrical insulation and the plurality of strands has a common wrapping.

2. Description of the Prior Art

Electrical conductors with a large cross section and intended for use as windings for electrical devices and machines, in particular for transformers, are subdivided into a large number of strands wherein each strand has a separate electrical insulation, which are connected in parallel at the ends. In the so-called continuously transposed cables or Roebel rods, strands with an approximately rectangular cross section which are provided with an insulating varnish and are made of copper, aluminum or an alloy thereof, are combined to an approximately rectangular cross section. To minimize the effects from current displacement, the position of the strands over the entire cross section of the multiple parallel conductor is interchanged repeatedly along the length of the continuously transposed cable or Roebel rod. This is accomplished by offsetting the strands with a suitable tool at predetermined locations, so that the position of the strands in the multiple parallel conductor changes. The manufacture of the continuously transposed cables, unlike that of the Roebel rods, is continuous. The periodic change in the position of the individual strands over the cross section of the multiple parallel conductor advantageously keeps losses from eddy currents low. For example, the flat sides of the strands are bent or offset about the longitudinal axis of the multiple parallel conductor, wherein the order of the strands over the cross section of the multiple parallel conductor is maintained over several recurring cycles.

The bundle is generally made up from individual strands which each have their own electrical insulation, with a common wrapping of insulating tapes, such as, for example, paper tapes, which usually cover the strands completely. The number is tape layers depends of the respective application. In general, the common wrapping of the strands helps to hold the multiple parallel conductor together when the multiple parallel conductor is wound on a supply drum, transported, and unwound from the supply drum, and to prevent damage to the multiple parallel conductor. At high operating voltages of, for example, in excess of 20 kV, which can be present particularly on the high voltage side of transformers, the wrapping of the strands also increases the electrical insulation to provide the required dielectric strength. Such a higher electrical insulation is not required at lower voltages.

In transformer as well as in other electrical devices and machines, the observed electrical losses lead to considerable heating of the multiple parallel conductors employed for the windings. An oil is commonly used to remove the heat. The cooling efficiency depends strongly on the thickness of the electrical insulation. Cooling is optimized when the multiple parallel conductors do not have any additional electrical insulation at all, i.e. when the multiple parallel conductors are wound without a wrapping. As was described above, this can presently only be realized on the low voltage side of transformers. There, the wrapping which holds the strands of the multiple parallel conductor together, is removed just before the winding is formed on the electrical device or the electrical machine, which is a time-consuming and complicated operation.

From WO 95/30991, a multiple parallel conductor is known wherein a woven tape with a mesh size of at least 2 mm is wound around the strands. The weft and/or warp threads of the woven tape are made of polyester or of a yarn blend comprised of polyester. In addition, the woven tape can also be pre-impregnated with a partially cross-linked epoxy resin to increase the mechanical strength of the multiple parallel conductor.

SUMMARY OF THE INVENTION

It is therefore an object of the invention to provide an improved multiple parallel conductor for windings of electrical devices and machines which effectively is not damaged when wound on and unwound from cable drums and during transport. It is another object of the invention to enable optimum cooling of the wound winding when the electrical device and the electrical machine, respectively, is operated.

This object is solved by the invention in that at least one rip cord which extends in the longitudinal direction of the multiple parallel conductor, is disposed underneath the wrapping.

Advantageously, the rip cord provides a simple and costs-effective means to tear and remove the wrapping of the common wrapping of the strands of the multiple parallel conductor before the winding of the electrical device or the electrical machine is formed. The conventional wrapping securely and firmly holds the strands together when the multiple parallel conductor is wound on or unwound from cable supply drums and during transport. At the same time, damage to the strands and the layers of insulating varnish is prevented. The at least one additional rip cord does not noticeably alter the outer shape of the multiple parallel conductor and thus does interfere with the winding and unwinding operation. On the supply drum, the multiple parallel conductor can be wound in a compact and closely spaced fashion and are thereby prevented from sliding and tilting, so that even a very long multiple parallel conductor is not damaged. After the winding is formed, the multiple parallel conductor does not comprise any additional elements, such as paper tapes, woven tapes and the like, thereby eliminating direct electrical discharges between adjacent windings of the electrical device or the electrical machine and obstruction of the coolant flow by additional elements blocking the cooling channel cross section. The multiple parallel conductor of the invention moreover can be manufactured in a simple and cost-effective fashion, since only at least one rip cord has to be placed underneath the wrapping.

In order to be able to keep the cross section of a rip cord as small as possible, and in order to prevent damage to the insulating varnish coating of the strands from the rip cord when the wrapping is torn open, the rip cord is advantageously made of a plastic with a high tensile strength, such as polyamide or polyaramide. With this design, the total cross section of the multiple parallel conductor is essentially unaffected by the presence of the rip cord.

The wrapping is advantageously constructed of at least one paper tape so that the multiple parallel conductor can be manufactured cost-effectively and the common wrapping of the strands can be easily removed. In yet another advantageous embodiment, the common wrapping can be constructed in the form of a woven tape and/or in the form of a tape or thread comprising a plastic.

In another advantageous embodiment, a support tape which extends in the longitudinal direction of the multiple parallel conductor and is glued to wrapping, is disposed on the outside or on the inside of the wrapping to facilitate removal of the wrapping.

The invention will be fully understood when reference is made to the following detailed description taken in conjunction with the drawings.

DETAILED DESCRIPTION OF THE INVENTION

Figure 1:
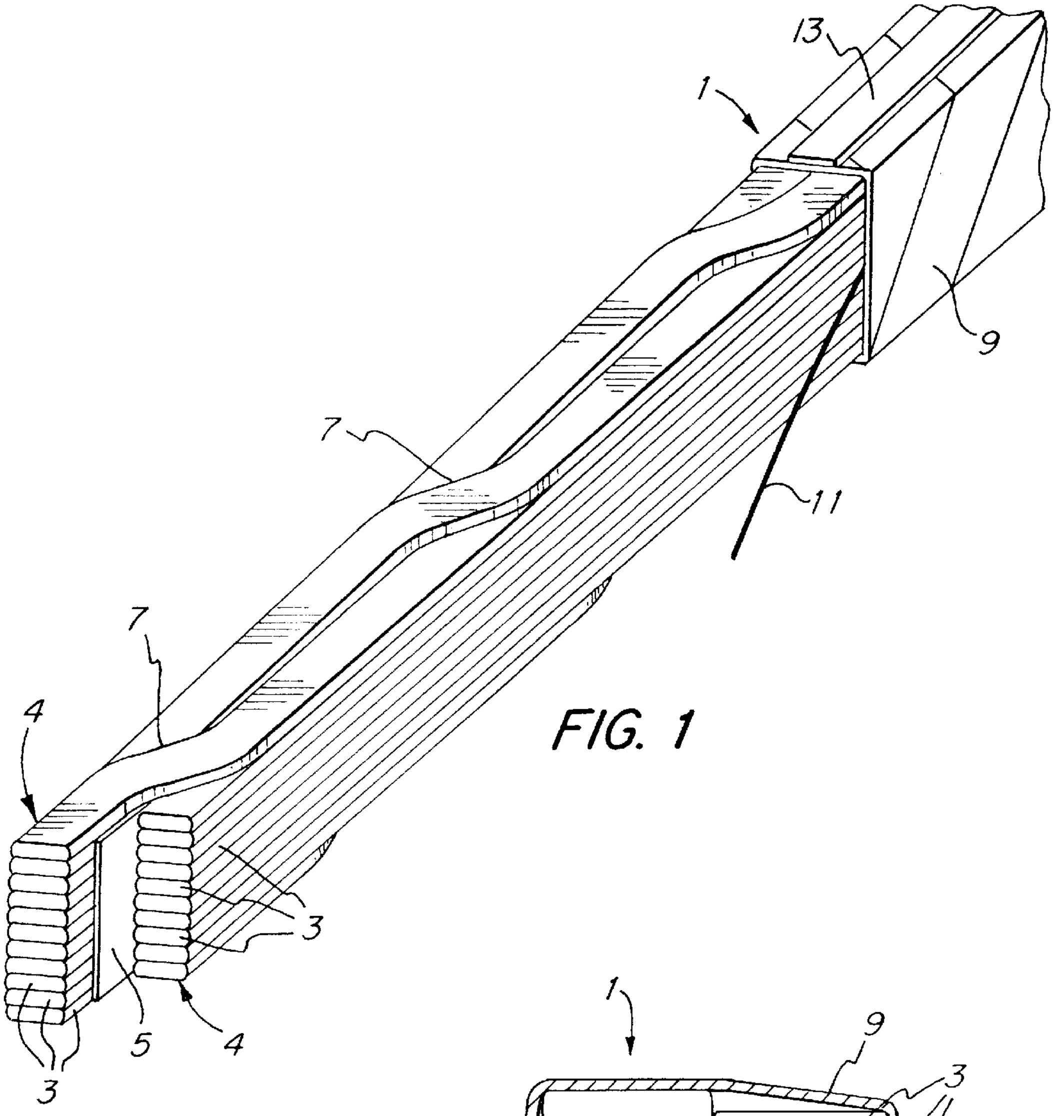
FIG. 1 is a perspective view of a first embodiment of a multiple parallel conductor made in accordance with the invention.
Figure 2:
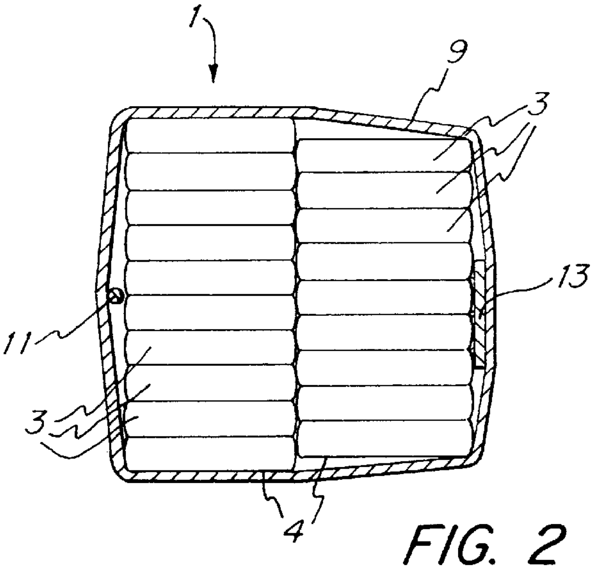
FIG. 2 is a cross-sectional view of a second embodiment of the multiple parallel conductor.

The multiple parallel conductors 1 which are depicted in exemplary form in FIGS. 1 and 2 and which are designed as continuously transposed cables especially for applications in transformer winding, have a plurality of flat strands 3 with an approximately rectangular cross section. The strands 3 are arranged, for example, in two juxtaposed stacks 4, with a paper tape 5 extending in the longitudinal direction between the two stacks 4, as is shown in FIG. 1. Each one of the strands 3 is provided with its own insulating varnish coating to ensure adequate electrical insulation between the adjacent strands 3. To improve the mechanical strength of the electrical insulation, an additional coating of a partially cross-linked epoxy varnish can be applied over the insulating varnish coating of each strand 3. Instead of employing an insulating varnish coating, the strands 3 can also be electrically insulated by wrapping each strand 3 with a suitable foil, paper or a similar material. The strands 3 are offset along their flat side at predetermined intervals, so that the position of the individual strands 3 over the entire cross section of the multiple parallel conductor 1 changes at comparatively short intervals in a regular pattern. The offset points are designated in FIG. 1 with the numeral 7.

A common wrapping 9 which is made of for example paper tapes, is placed over the bundle of electrically insulated strands 3 formed in this manner. The wrapping 9 consists usually of between one and five layers of paper tape and covers the strands 3 completely. If the number of layers is small, the wrapping 9 is easier to remove. It is also feasible to fabricate the common wrapping 9 of the strands 3 of different thread-like or tape-like materials, such as woven tapes, or of tapes or threads comprising a plastic. The wrapping 9 can also include spaces or gaps which is not illustrated in the embodiments of FIGS. 1 and 2. Alternatively, a closed, for example an extruded, plastic sleeve can be used in place of the wrapping 9.

Underneath the wrapping 9, there is disposed for example a rip cord 11 extending in the longitudinal direction along the entire length of the multiple parallel conductor 1, so that the wrapping 9 can be removed easily and cost-effectively during manufacture of the windings for electrical devices and machines, i.e. at the same time when the continuously transposed cables are wound. An additional rip cord can be placed, for example, on the opposite side of the strand bundle. The rip cord or cords 11, respectively, can be placed anywhere underneath the wrapping 9, i.e. at locations different from those shown in the illustrated embodiments. With the rip cord 11, the wrapping 9 which encloses all the strands 3, can be removed easily by tearing the rip cord.

The rip cord 11 is made, for example, of a plastic with a high tensile strength, such as polyamide or polyaramid. However, the rip cord 11 can also be made of a plastic which is reinforced with glass fibers, or of other fibers with high tensile strength, of hemp or of any suitable material with high tensile strength. The material for the rip cord 11 should be selected so that the rip cord 11 has the smallest possible cross section and does not damage the insulating varnish coating of the strands 3.

In the embodiment illustrated in FIG. 1, on the outside of the common wrapping 9 of the strands 3 there is disposed a support tape 13 which extends in the longitudinal direction of the multiple parallel conductor 1 and which is coated with an adhesive and affixed to the wrapping 9. The support tape 13 has the purpose to hold the individual elements of the wrapping 9 together after the rip cord is torn, so that the wrapping 9 can be removed easily and completely without contamination from loose constituents of the wrapping.

In different advantageous embodiment, the support tape 13 is facing the rip cord 11, i.e. disposed on the same side of the multiple parallel conductor 1 as the rip cord 11.

In the embodiment illustrated in FIG. 2 which is different from the embodiment of FIG. 1, the support tape 13 extends parallel to the longitudinal direction of the multiple parallel conductor 1, but is placed between one of the stacks of strands 4 and the inside of the wrapping 9 on that side of the multiple parallel conductor 1 which faces away from the rip cord 11. In this second embodiment, the side of the support tape 13 facing the wrapping 9 is coated with an adhesive. The support tape 13 is affixed to the inside of the wrapping 9 with the help is this adhesive.

In this embodiment, the support tape 13 adheres firmly and securely to the wrapping 9 without requiring additional measures, since the tapes of the wrapping 9 are wound under tension around the stacks of strands 4 and thus firmly contact and are pressed against the support tape 13 which is coated with adhesive on the side facing the wrapping. Of course, the rip cord 11 and the support tape 13 can be placed at arbitrary locations underneath the wrapping 9. It is also possible to use several rip cords and/or support tapes coated with adhesives.

The embodiments described above admirably achieve the objects of the invention. However, it will be appreciated that departures can be made by those skilled in the art without departing from the spirit and scope of the invention which is limited only by the following claims.

What is claimed is:

1. Multiple parallel conductor, in particular a continuously transposed cable, for windings of electrical devices and machines, comprising:

(a) a plurality of conductive strands wherein each strand has a separate electrical insulation;

(b) a common wrapping on the plurality of strands; and (c) at least one rip cord underneath the wrapping and extending in a longitudinal direction of the multiple parallel conductor.

2. Multiple parallel conductor according to claim 1, wherein the rip cord is made of a plastic with a high tensile strength.

3. Multiple parallel conductor according to claim 2, wherein the plastic of the rip cord is chosen from a group consisting of polyamide and polyaramide.

4. Multiple parallel conductor according to claim 1, wherein the common wrapping of the strands is chosen from a group consisting of at least one paper tape, at least one woven tape, at least one plastic tape and at least one plastic thread.

5. Multiple parallel conductor according to claim 1, further comprising at least one support tape adhered on an exterior surface of the common wrapping of the strands, the at least one support tape extends in the longitudinal direction of the multiple parallel conductor.

6. Multiple parallel conductor according to claim 5, wherein the support tape is disposed on a side of the multiple parallel conductor opposite of the rip cord.

7. Multiple parallel conductor according to claim 6, wherein the support tape has an adhesive for adhering the support tape to the surface.

8. Multiple parallel conductor according to claim 5, wherein the support tape has an adhesive for adhering the support tape to the surface.

9. Multiple parallel conductor according to claim 1, further comprising at least one support tape adhered on an interior surface of the common wrapping of the strands, the at least one support tape extends in the longitudinal direction of the multiple parallel conductor.

10. Multiple parallel conductor according to claim 9, wherein the support tape is disposed on a side of the multiple parallel conductor opposite of the rip cord.

11. Multiple parallel conductor according to claim 10, wherein the support tape has an adhesive for adhering the support tape to the surface.

12. Multiple parallel conductor according to claim 9, wherein the support tape has an adhesive for adhering the support tape to the surface.

13. Multiple parallel conductor according to claim 1, wherein the common wrapping of the strands is chosen from a group consisting of at least one tape and at least one thread wrapped around the strands.

14. Multiple parallel conductor according to claim 1, wherein the common wrapping of the strands is at least one tape wrapped around the strands.

* * * * *